United States Patent [19]
Svensson

[11] 3,806,030
[45] Apr. 23, 1974

[54] APPARATUS FOR SIMULTANEOUS FLUSH CLEANING MIXING CHAMBERS

[75] Inventor: Sven Rolf Svensson, Stenungsund, Sweden

[73] Assignee: Svenska Aktiebolaget Plastic Protection, Goteborg, Sweden

[22] Filed: July 17, 1973

[21] Appl. No.: 379,983

Related U.S. Application Data
[62] Division of Ser. No. 136,666, April 23, 1971, Pat. No. 3,752,398.

[30] Foreign Application Priority Data
Apr. 27, 1970 Sweden.............................. 5836/70

[52] U.S. Cl...................... 239/112, 137/15, 134/18
[51] Int. Cl.......................... B05b 15/02, B08b 7/04
[58] Field of Search ............... 239/1, 104, 106, 112; 134/18; 264/39; 251/207; 137/15, 625.19, 625.22

[56] References Cited
UNITED STATES PATENTS
| | | | |
|---|---|---|---|
| 3,131,706 | 5/1964 | Harban | 137/15 |
| 3,219,273 | 11/1965 | Killen | 239/104 UX |
| 3,386,461 | 6/1968 | Fisher | 251/207 X |
| 3,558,051 | 1/1971 | Strickler | 239/1 |
| 3,572,366 | 3/1971 | Wiggins | 239/112 X |
| 3,653,594 | 4/1972 | Bok et al. | 239/112 X |
| 3,672,570 | 6/1972 | Scarbrough et al. | 239/112 X |

*Primary Examiner*—Robert S. Ward, Jr.
*Attorney, Agent, or Firm*—Holman & Stern

[57] ABSTRACT

In machines for spraying plastics, there is a risk that the spray head may be blocked by curing plastic mixture if the head with its mixing chamber is not carefully cleaned as soon as a spraying cycle is completed. The present invention eliminates this risk by an apparatus for flush cleaning the spray head by means of a cleaning liquid which is injected in the head, with said injection being controlled by means of valves also controlling the mixing and spraying of the plastic.

2 Claims, 7 Drawing Figures

APPARATUS FOR SIMULTANEOUS FLUSH CLEANING MIXING CHAMBERS

This application is a division of my co-pending application Ser. No. 136,666 filed Apr. 23, 1971, now Pat. No. 3,752,398.

BACKGROUND OF THE INVENTION

The present invention relates to an apparatus for simultaneously flush cleaning mixing chambers in the spraying head of machines for homogenizing and spraying reactive additive plastics having a short inductive period.

The creation of two-component systems of monomer synthetic plastics, preferably without solvents, which, upon addition and homogenization without the supply of heat, spontaneously polymerize into nonreversible duro-plastics of, for instance, epoxy-or urethane type has founded a need of practically usable apparatus for applying these materials, primarily by spraying.

These materials are already of great importance as surface layers for sealing and reinforcing concrete, primarily in the form of floorings, and as corrosion protectives for steel. Due to their rather viscous nature, the materials are difficult to apply on vertical surfaces in thick layers as it is difficult to give them a desired thixotrope nature in order to prevent dripping. This drawback is largely eliminated if the polymerization is advanced so fast that the material will set before any dripping has taken place.

Due to the very short period of time, often only some seconds, which elapses after the material components have been mixed and homogenized until the polymerization has advanced so far that the flowing material changes to a rigid product, it is necessary to be able to quickly clean the members of the apparatus which have come into contact with the homogenized (activated) material, at the end of each spraying cycle. This has hitherto been carried out by separate manual activation of rotary or pressure valves, whereby cleaning liquid followed by air or cleaning liquid and air together have been caused to flush through the mixing chamber, etc. Other functions such as starting and stopping the mixing motor for the mixing chamber, opening and shutting off air for atomizing the homogenized materials and in certain cases stopping and starting the driving motors for dosing pumps have also been operated manually, often with separate controls located at different portions of the machine.

BRIEF DESCRIPTION OF THE DRAWINGS

The invention will hereinafter be further described in connection to a spraying machine shown in the accompanying drawings.

DESCRIPTION OF PREFERRED EMBODIMENTS

Figure 1:
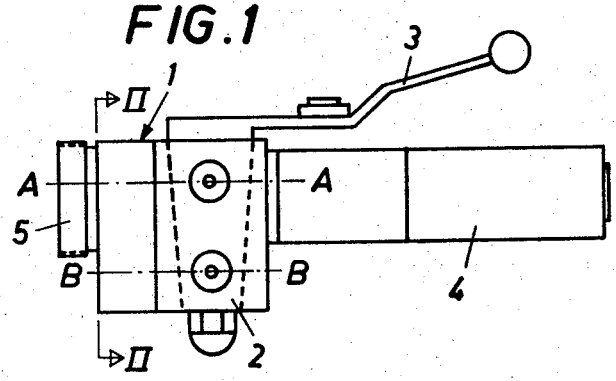
FIG. 1 shows mixing head forming part of the machine.
Figure 2:
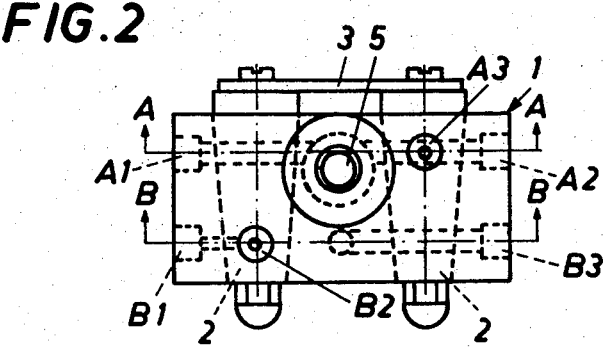
FIG. 2 is a view along line II-II in FIG. 1.

In FIGS. 1 and 2 is shown a mixing head 1 provided with two rotary valves 2, which are simultaneously actuated by means of a manually operable lever 3. The mixing head is provided with a mixing motor 4 which causes mechanical stirring of the resin components. The mixing head is further provided with an opening 5 leading to the spray nozzles. As can be seen from FIG. 2, the mixing head is also provided with a number of additional openings which are controlled by means of the rotary valves 2. Openings A1 and A2 are for the delivery of resin components to the mixing head. A3 is an opening for the cleaning liquid, while B1, B2, and B3 are openings for pressurized air.

Figure 3:
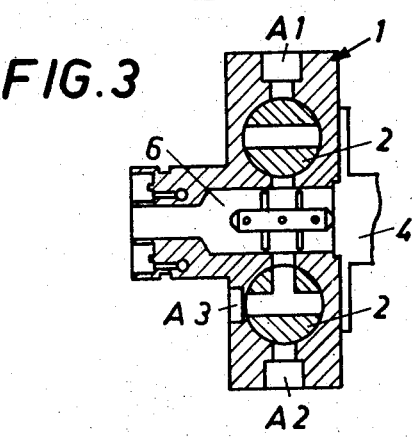
FIGS. 3 and 4 show a section along line A — A in FIGS. 1 and 2 in which a rotary valve included in the mixing head is in shut and open positions respectively.

FIG. 3 which is a section along line A — A in FIGS. 1 and 2 shows the mixing head 1 when the lever 3 is in the closed position. Hence, the passages A1 and A2 are closed, while the passage A3 is open, thereby allowing the cleaning liquid to reach the mixing chamber 6 in the mixing head.

Figure 4:
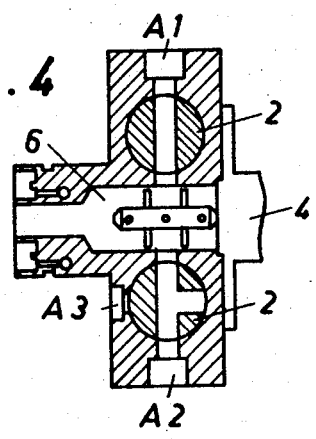

In FIG. 4, the lever 3 has been moved to the opened position, whereby the resin components may reach the mixing chamber via passages A1 and A2, and the passage A3 is closed.

Figure 5:
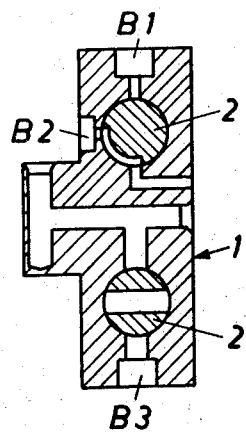
FIGS. 5 and 6 show sections according to FIGS. 3 and 4 along line B — B in FIGS. 1 and 2.

In FIG. 5, the mixing head is shown is closed position in a section along line B - B of FIGS. 1 and 2. The passages B1 and B3 are closed while B2 is open to the surrounding atmosphere.

Figure 6:
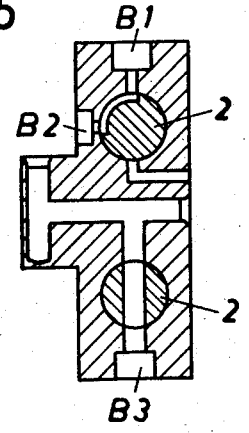

FIG. 6 shows a similar view in which the lever 3 is set to the open position. Passages B1 and B2 are interconnected and passage B3, which delivers pressurized air to the mixing head for atomizing the mixture, is opened.

Figure 7:
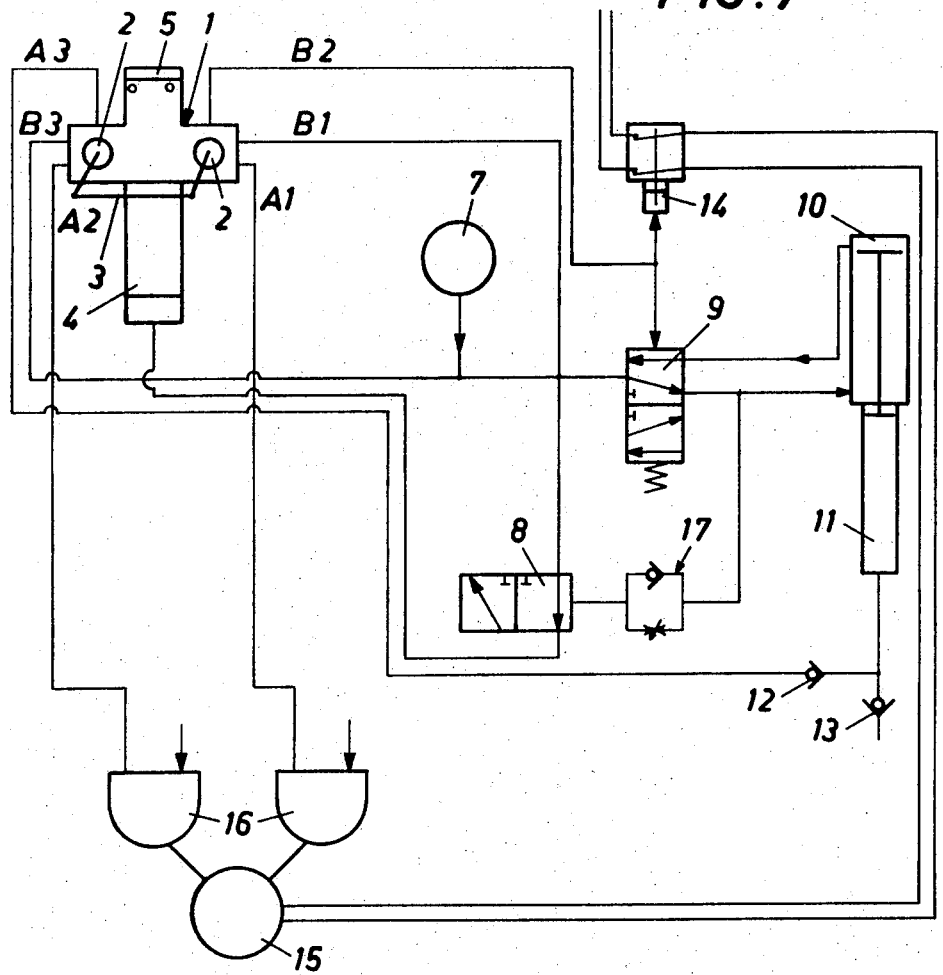
FIG. 7 shows schematically a complete view of the connections of the machine.

FIG. 7 finally illustrates an embodiment of the entire machine with its connections shown schematically. The machine is primarily driven by an air compressor 7, which is directly connected to openings B1 and B3 of the mixing head 1. The air compressor delivers air for driving the mixing motor 4 via a valve 8. The compressor is further, via a reversing valve 9, connected to an air cylinder 10, which is mechanically connected to and operates a pump 11 for the cleaning liquid.

The liquid pump 11 is connected to openings A3 via a line including a non-return valve 12. The compressed air supplied to opening B1 is, when the valve 2 is opened, transferred via passages B1 – B2 to the reversing valve 9, whereby the valve 9 is set in a position in which the compressed air from the compressor charges the air cylinder 10. The piston of this cylinder thereby makes a linear movement, whereby the piston of the cleaning liquid pump 11 is charged with cleaning liquid delivered via a line including a non-return valve 13. The compressed air from B2 also actuates a switch 14, which starts an electric motor 15. This motor drives, via speed variators (not shown), two dosing pumps 16 which supply openings A1 and A2 with the resin components. At the start of the spraying operation, the cleaning liquid pump then is automatically filled with a cleaning liquid.

When the spraying operation is completed, the lever 3 is set to the shut position. The passages A1 and A2 are thereby closed, passage A3 opened, passages B1 and B3 closed, and passage B2 is purged. As passage B2 is purged, the reversing valve 9 is, due to spring actuation, set in a new position in which the switch 14 is switched off, thereby turning off the motor 15 and the air passage to the air cylinder 10 is reversed. The piston of this cylinder 10 thereby makes a stroke so that the cleaning liquid from pump 11 is injected in the mixing chamber via passage A3.

The mixing motor 4 is not stopped at the same time as the dosing pumps 16 but continues to rotate during the beginning of the flush cleaning operation due to a delayed closing impulse, which is controlled by a circuit 17 actuating the valve 8. The mixing motor 4 thereby improves the cleaning effect, and the flush cleaning then automatically takes place as soon as the spraying operation is completed.

SUMMARY OF THE INVENTION

The purpose of the present invention is to provide a machine having a reliable function and a simplified maneuvering of all functions necessary for dosing, homogenizing and atomizing the material and for the immediate cleaning of the spraying nozzle after each spraying cycle by means of a simultaneous central operation from the spray head. Due to this, it is sufficient for the operator to make one single manipulation at the beginning and at the end respectively of each spraying cycle so that the operator can concentrate his attention to the spraying work, and his position while working on scaffoldings, etc. The risk of blocking or damaging the spray head due to failing cleaning is also eliminated.

The apparatus according to the invention is characterized in that a cleaning liquid immediately upon the end of the spraying cycle is injected into the mixing chamber of the spray head from a pneumatically driven pressure increasing pump on a servo impulse from rotary valves, which are mounted in the spray head and which also control other important functions, whereby the mixing chamber and adjacent members for atomizing the spraying media are cleaned from a reactive (monomer) plastic mixture, and that the pump is refilled by a servo impulse at the beginning of the next spraying cycle.

At the beginning of the spraying, the lever 3 which is mechanically connected to the rotary valve 2 for the respective resin components is pushed to the open position. Thus, connections A1, A2 are opened between tubes for resin components and the mixing chamber 6 as well as a connection for servo air to a relay for ventilating the mixing motor 4, which has started immediately. At the same time, a relay 14 which closes the circuit to an electric motor 15, which via speed variators run two dosing pumps 16 is ventilated, whereby the electric motor starts. The servo air also is used for actuating a reversing valve 9 which ventilates a piston in a compressed air cylinder 10, with the piston which is mechanically connected to a liquid piston pump 11 thereby making a linear motion so that the cleaning liquid is drawn into the liquid pump. Finally, the connection A3, distributing air for atomizing the media is opened. Two resin components now flow from the respective dosing pumps 16 through tubes into the mixing chamber 6 wherein they are homogenized by means of rotating and fixed members. The material thereupon passes through an opening 5 to a spray nozzle in which atomizing and spraying of the material takes place. Due to the limited volume of the mixing chamber, the material turn-over will be so great that there is no risk for polymerization of a higher degree as long as the spraying operation is continued.

At the end of the spraying, the lever 3 is pushed to the shut or closed position, whereby the direct connections for resin components A1, A2 and atomizing air B3 through the rotary valves 2 are stopped. At the same time, the relay 14 for the pump motor 15 is purged, so that the pump motor stops and the distribution of resin components ends. The reversing valve 9 to the air cylinder 10 of the cleaning liquid pump 11 is purged, and the valve slide, due to spring actuation, is carried to its original position in which the air cylinder piston is ventilated. The cleaning fluid, which earlier has been drawn in thereby is emitted from the connected liquid pump to the mixing chamber 6 with an increased pressure depending on the difference in area between the air piston and the pump piston. Non-return valves 12, 13 are arranged in a conventional manner on the liquid pump 11 in order to make in-and-out-pumping possible. By means of a delay arrangement 17, the mixing motor 4 continues to rotate some seconds after the cleaning has taken place in order to make the cleaning more efficient.

What is claimed is:

1. In a machine for spraying plastics, a mixing head having a mixing chamber, said mixing chamber being connected to a plurality of spray nozzles, two rotary valves in the mixing chamber, said valves being mechanically connected and operated manually by a common lever, two dosing pumps for supplying resin components, a source of pressurized air for atomizing the resin mixture, the valves in one position providing connections between the mixing chamber and the dosing pumps and between the mixing lchamber and the source of pressurized air, a cleaning liquid pump, an air cylinder provided with a piston mechanically connected to the cleaning liquid pump, a conduit between the pressure side of the cleaning liquid pump and the mixing chamber, one of the valves in said one position further connecting the source of pressurized air with a reversing valve to maintain the position of such valve, said one valve being designed to connect the source of pressurized air with one of the ends of the air cylinder, the valves in a second position connecting the cleaning liquid pump with the mixing chambers, closing the connections for resin components and atomizing air, disconnecting the connection between the source of pressurized air and the reversing valve and purging the conduit therebetween thus causing the reversing valve to switch to a position to initiate a cleaning cycle in which the cleaning liquid pump forces liquid through the mixing chamber.

2. The machine as claimed in claim 1 including a pneumatic mixing motor in the mixing head to assist the mixing by stirring the resin components, said motor being fed by a conduit from the source of pressurized air, said conduit having a valve governed by the reversing valve, and a delay circuit provided between the reversing valve and the mixing motor feeding valve to maintain the connection between the motor and source of pressurized air open during at least a part of the cleaning cycle.

* * * * *